United States Patent
Ortiz Del Cerro et al.

(10) Patent No.: US 9,677,409 B2
(45) Date of Patent: Jun. 13, 2017

(54) MONOLITHIC FAN COWL OF AN AIRCRAFT ENGINE AND A MANUFACTURING METHOD THEREOF

(71) Applicant: EADS CONSTRUCCIONES AERONÁUTÌCAS S.A., Getafe (ES)

(72) Inventors: Álvaro Ortiz Del Cerro, Getafe (ES); Joaquín Gallego Pleite, Getafe (ES); Luis Rubio García, Getafe (ES); Sofía Ponce Borrero, Getafe (ES)

(73) Assignee: Eads Construcciones Aeronauticas S.A., Madrid (ES)

( * ) Notice: Subject to any disclaimer, the term of this patent is extended or adjusted under 35 U.S.C. 154(b) by 467 days.

(21) Appl. No.: 14/196,330

(22) Filed: Mar. 4, 2014

(65) Prior Publication Data
US 2014/0248143 A1    Sep. 4, 2014

(30) Foreign Application Priority Data
Mar. 4, 2013   (EP) .................................... 13382070

(51) Int. Cl.
*B64D 29/00*   (2006.01)
*F01D 9/02*    (2006.01)
*B29C 70/44*   (2006.01)
*B29D 99/00*   (2010.01)

(52) U.S. Cl.
CPC ................ *F01D 9/02* (2013.01); *B29C 70/44* (2013.01); *B29D 99/0014* (2013.01); *B64D 29/00* (2013.01)

(58) Field of Classification Search
CPC ............................ B29D 99/0014; B64D 29/00
USPC ........................................................ 415/208.1
See application file for complete search history.

(56) References Cited

U.S. PATENT DOCUMENTS

| 4,471,609 | A |   | 9/1984 | Porter et al. |           |
|-----------|---|---|--------|---------------|-----------|
| 5,297,765 | A | * | 3/1994 | Hughes        | B64C 21/06 |
|           |   |   |        |               | 244/130   |
| 6,358,014 | B1| * | 3/2002 | Chou          | B64C 11/14 |
|           |   |   |        |               | 29/889.1  |

(Continued)

FOREIGN PATENT DOCUMENTS

| DE | 10 2011 012319 |    | 8/2012 |           |
|----|----------------|----|--------|-----------|
| DE | WO 2012113426 A1 | * | 8/2012 | B32B 15/14 |

(Continued)

OTHER PUBLICATIONS

European Search Report dated Jul. 5, 2013 in EP 13382070.4.

*Primary Examiner* — Gregory Anderson
*Assistant Examiner* — Michael Sehn
(74) *Attorney, Agent, or Firm* — Nixon & Vanderhye P.C.

(57) ABSTRACT

The invention provides a fan cowl (11) of an aircraft engine made of a composite material having an optimized structure for withstanding the expected loads and for being able to be manufactured as a monolithic ensemble. The structure comprise a skin (13), frames (15) of a closed cross-section arranged in a transverse direction to the longitudinal axis of the aircraft and longitudinal beams (17, 19) comprising first parts (21) of a closed cross-section to be superimposed to the transverse frames (15) in their crossing zones and second parts (23) of an open cross-section in zones not crossing transverse frames (15) having their webs (41) arranged in a same plane. The invention also refers to a manufacturing method of said fan cowl (11).

17 Claims, 3 Drawing Sheets

(56) References Cited

U.S. PATENT DOCUMENTS

| | | | |
|---|---|---|---|
| 6,375,121 B1 | 4/2002 | Porte et al. | |
| 6,458,309 B1* | 10/2002 | Allen | B29C 70/446 |
| | | | 156/197 |
| 6,479,124 B1* | 11/2002 | Porte | B29C 70/86 |
| | | | 264/257 |
| 2006/0290028 A1* | 12/2006 | Pleite | B29C 70/44 |
| | | | 264/258 |
| 2012/0001023 A1 | 1/2012 | Arevalo Rodriguez et al. | |

FOREIGN PATENT DOCUMENTS

| | | |
|---|---|---|
| EP | 1 707 344 | 10/2006 |
| FR | 2 771 331 | 5/1999 |
| WO | 9926841 | 6/1999 |

\* cited by examiner

MONOLITHIC FAN COWL OF AN AIRCRAFT ENGINE AND A MANUFACTURING METHOD THEREOF

This application claims priority to EP Application No. 13382070.4, filed 4 Mar. 2013, the entire contents of which is hereby incorporated herein by reference.

FIELD OF THE INVENTION

The invention relates to a fan cowl of an aircraft engine and more in particular to a monolithic fan cowl made of composite material and to a manufacturing method of it.

BACKGROUND

The nacelle of turbofan aircraft engines comprises right and left fan cowls covering internal parts of the engine that shall be operable to provide access to internal components of the engine for maintenance purposes.

WO 99/26841 describes a fan cowl which is a panel having a network of transverse and longitudinal beams which is manufactured draping composite material on a mold having the shape of the panel to be obtained and baking to polymerize.

EP 1 707 344 describes a method of manufacturing a monolithic fan cowl of composite materials with transverse and longitudinal beams of an omega-shaped cross-section.

A drawback of the fan cowls described in said documents is that the geometry of the longitudinal beams is not well adapted to the functional needs of the fan cowls with respect to the entry of loads.

A drawback of the manufacturing methods described in said documents is that they use, basically, uncured composite materials implying tolerances in the final surfaces of the fan cowl.

SUMMARY OF THE INVENTION

It is an object of the present invention to provide a fan cowl of an aircraft engine made of a composite material having an optimized structure for withstanding the expected loads and for being able to be manufactured as a monolithic ensemble with the desired final geometry and in a shorter time than in the prior art.

In a first aspect, this and another objects are met by a monolithic curvilinear fan cowl of a composite material structured by a skin, frames of a closed cross-section (preferably of an omega cross-section) arranged in a transverse direction to the longitudinal axis of the aircraft and longitudinal beams comprising first parts of a closed cross-section to be superimposed to the transverse frames in their crossing zones and second parts of an open cross-section (preferably an I cross-section) in zones not crossing transverse frames having their webs arranged in a same plane. This structure allows achieving a fan cowl of a composite material with the required strength and a fan cowl that can be manufactured with the required geometry.

In an embodiment the caps of the longitudinal beams have not a constant width along its length. In those portions suitable for being used as union areas of fittings of the engine, the caps have a variable width, larger in all its length than the width of portions of constant width.

In an embodiment, the caps of the first parts of the longitudinal beams are asymmetric with respect to the plane of the webs of the second parts. The second parts comprise a central portion having a cap and a foot of constant width (and optionally transverse ribs in zones affected by concentrated loads) and end portions, having a cap and a foot of variable width, ending in the first parts. The second parts have generally a constant height (the same height as the first parts) but a longitudinal beam can include a second part with a central portion of a variable height in a particular zone of the fan cowl. This configuration is well adapted to the needs of the longitudinal beams of fan cowls that are preferably located in the upper and lower ends of the fan cowl and in its central zone.

In a second aspect, the above-mentioned objects are met by a method of manufacturing said curvilinear fan cowl comprising the following steps: a) providing the skin uncured, the transverse frames cured and the longitudinal beams cured; the transverse frames and the longitudinal beams including respectively adhesive layers in their inner faces in contact with other components; b) placing the skin on an autoclave tool; c) placing said transverse frames with a vacuum bag inserted into them on the skin; d) placing said longitudinal beams over the transverse frames and the skin; e) covering the assembly with a vacuum bag; f) performing an autoclave cycle under predetermined temperature and pressure conditions for co-bonding the skin, the transverse frames and the longitudinal beams and for carrying out a secondary bonding of the longitudinal beams to the transverse frames.

The use of transversal frames and longitudinal beams cured allows a better control of the geometry of the fan cowl and reduces the manufacturing time.

Other desirable features and advantages of the invention will become apparent from the subsequent detailed description of the invention and the appended claims, in relation with the enclosed drawings.

DETAILED DESCRIPTION OF THE INVENTION

The structural components of the curvilinear fan cowl 11 of an aircraft engine according to the embodiment shown in the FIGS. 1-4 are a skin 13, transverse frames 15 with an omega-shaped cross-section and longitudinal beams 17, 19 (parallel to the longitudinal axis of the aircraft) with an I shaped cross-section except for the parts to be superimposed to the transverse frames 15. In this embodiment the configuration of the caps of the longitudinal beams 17, 19 in their crossing zones with the transverse frames 15 is adapted for being used as union areas of fittings of the engine.

Figure 1:
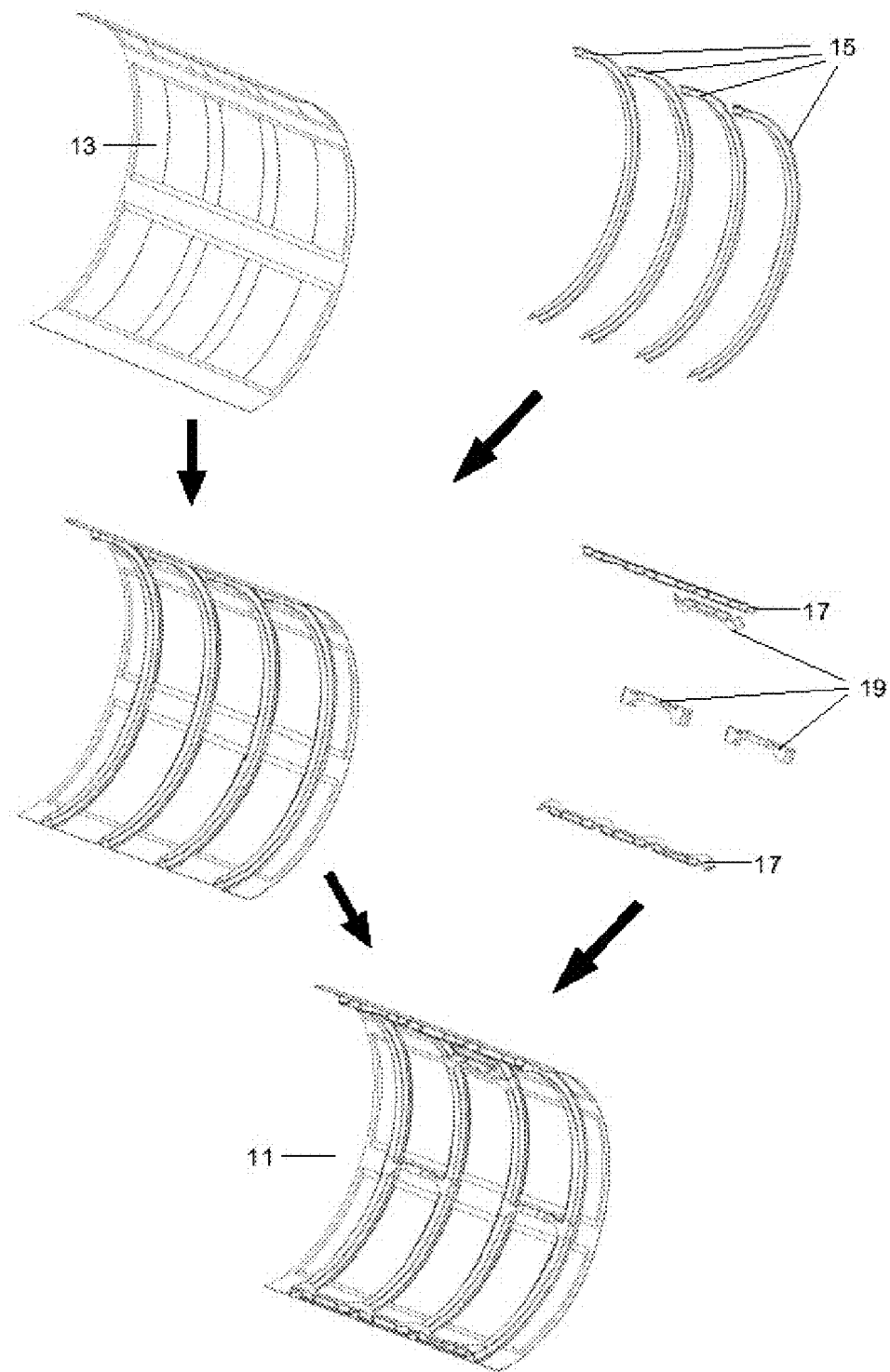
FIG. 1 is a schematic view of the components of a fan cowl of an aircraft engine and of its manufacturing method according to the invention.

In the embodiment illustrated in FIG. 1 the transverse frames 15 are equally spaced in the longitudinal direction of the fan cowl 11, two longitudinal beams 17 are placed over the transverse frames 15 in the upper and lower ends of the fan cowl 11 and three longitudinal beams 19 are placed over two transverse frames 15 in inner zones of the fan cowl 11.

Figure 2:
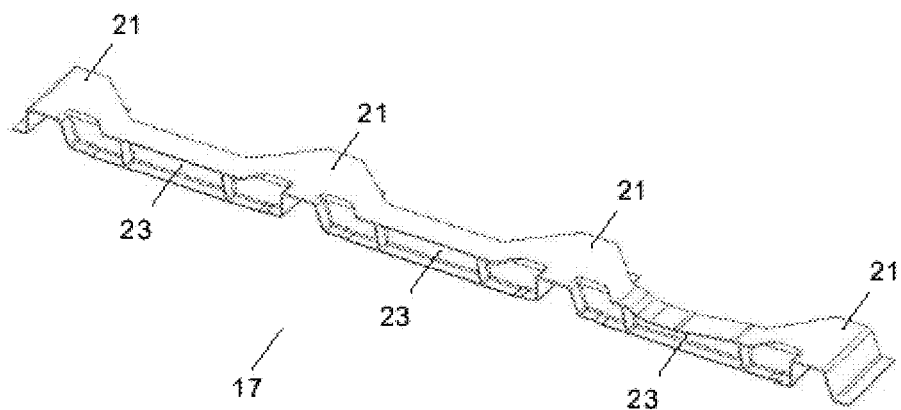
FIG. 2 is a perspective view of an embodiment of a longitudinal beam of a fan cowl according to the invention.

As shown in FIG. 2, the longitudinal beams 17, 19 comprise first parts 21 in their crossing zones with the transverse frames 15 and second parts 23 in the rest of their length, having their webs arranged in a same plane.

The longitudinal beams 17 comprise four first parts 21 and three second parts 23 while the longitudinal beams 19 comprise two first parts 21 and one second part 23 (see FIG. 1).

Figure 3A:
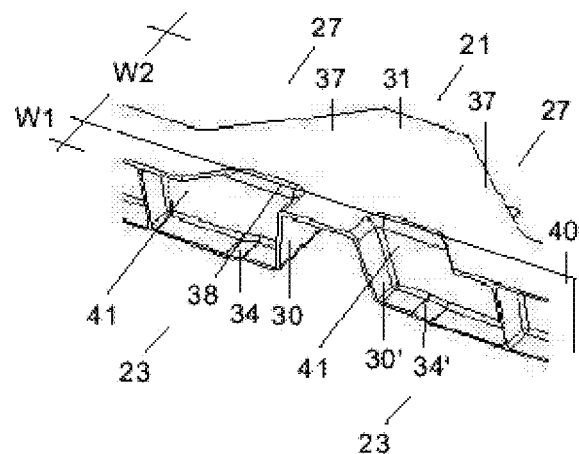
FIG. 3a is an enlarged perspective view of the crossing zone of a longitudinal beam with a transverse frame showing a first part and two end portions of a second part of it.
Figure 3B:
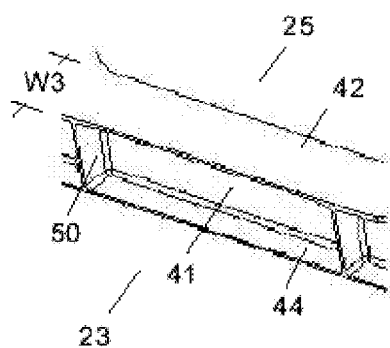
FIG. 3b is an enlarged perspective view of the central portion of a second part of a longitudinal beam.
Figure 4:
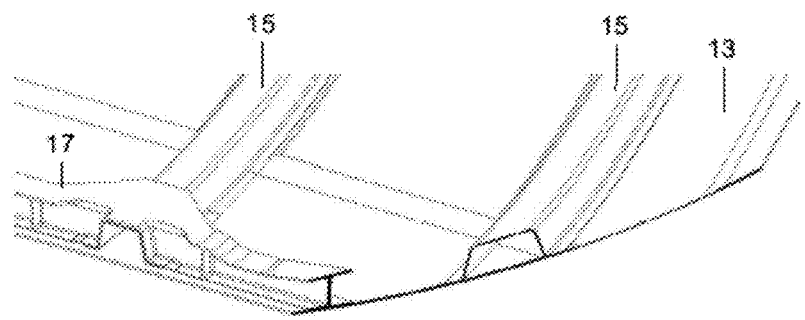
FIG. 4 is a perspective view of a zone the fan cowl in one of its borders.

As shown in FIGS. 3a and 3b, the first parts 21 of the longitudinal beams 17, 19 comprise a cap 31, two webs 30, 30' and two feet 34, 34' having a cross-section of an omega shape to be superimposed to the transverse frames 15 and the second parts 23 comprise a central portion 25 and two end portions 27 with webs 41.

The caps 31 of the first parts 21 are not symmetric with respect to the plane 40 of the webs 41 of the second parts 23. They have a first area of width W1 at one side of the plane 40 of the webs 41 and a second area of width W2 at the other side, being W2>W1.

The central portion 25 of the second parts 23 is symmetric with respect to its web 41. It has a cap 42 and a foot 44 of a constant width W3. As shown in FIG. 2 a longitudinal beam 17 can have a second part 23 with a central portion of a variable height to attend specific requirements. As shown in FIG. 3b, a central portion 25 can include ribs 50 as reinforcing elements in particularly loaded zones such as zones with fittings transmitting loads from external elements.

In the embodiment shown in the Figures the border of the first area of the caps 31 of the first parts 21 is aligned with the corresponding border of the cap 42 of the central portion 25 of the second parts 23 and therefore W3=2×W1.

The end portions 27 of the second parts 23 are not symmetric with respect to the plane 40 of their webs 41.

The caps 37 of the end portions 27 have a variable width for accommodating the change in width between the caps 42 of the central portions 25 of the second parts 23 and the caps 31 of the first parts 21.

As illustrated in FIG. 3a the widening of the caps 37 are concentrated towards the second area of the first parts 21. On the other side, the caps 37 include a recess 38.

The method of manufacturing the curvilinear fan cowl 11 of aircraft engines according to the present invention involves manufacturing separately the skin 13, the transverse frames 15, the longitudinal beams 17, 19 and the assembly of said components in the sequence illustrated in FIG. 1.

The transverse frames 15 and the longitudinal beams 17, 19 are provided to the assembly stage in a cured state and the skin 13 in an uncured state.

The skin 13 can be manufactured by a manufacturing method comprising the following steps:
Automate fiber-placement of carbon fiber prepreg on a cylindrical mandrel.
Lay-up of additional layers for lightning protection and/or erosion and/or impact protection.
Unloading the skin 13 from the mandrel (the skins for the left and right fan-cowls can be made at the same time and then separated by a cutting method before unloading from the mandrel) for being located in the tool 61 used in the assembly stage of the fan cowl 11.

The transverse frames 15 and the longitudinal beams 17, 19 can be manufactured by any suitable CFRP ("Carbon Fiber Reinforced Plastic") manufacturing method and, particularly, by a Resin Transfer Moulding (RTM) method for achieving a good dimensional control.

Figure 5:
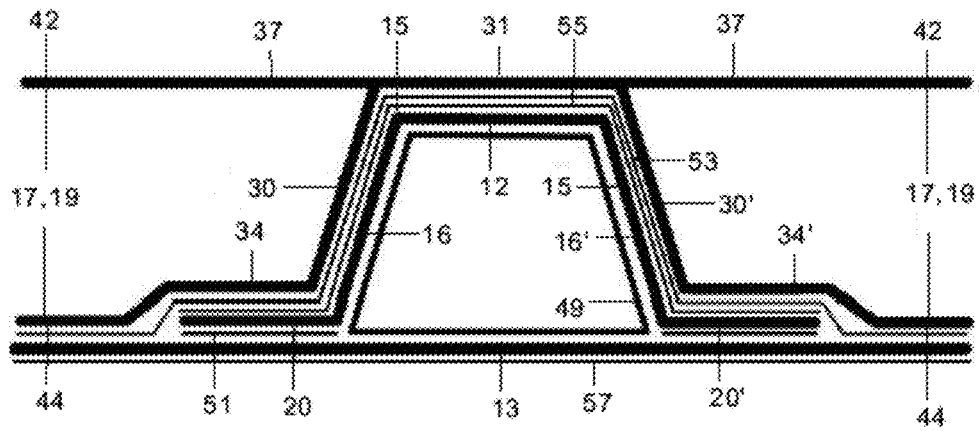
FIG. 5 is a schematic cross-section view of the assembly of the fan-cowl components before the curing step.
Figure 6:
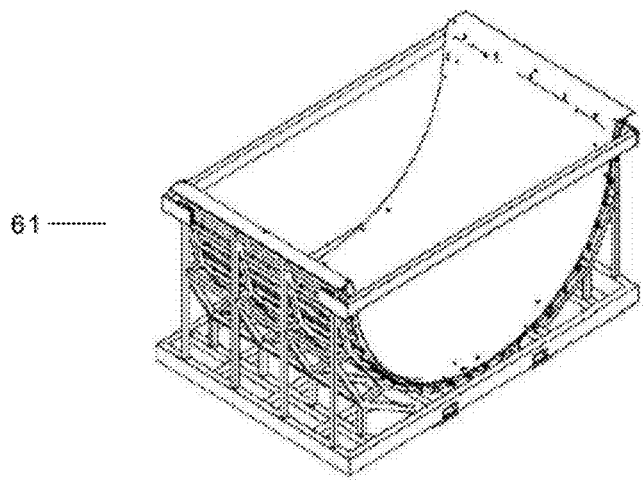
FIG. 6 is a perspective view of the tooling used for curing the fan-cowl assembly.

In reference to FIGS. 5 and 6 we will now describe the main steps of the manufacturing method according to the invention.

The skin 13 with a metallic mesh 57 in its outer face is located on the autoclave tool 61.
An adhesive layer 51 is laid-up on the inner faces of the transverse frames 15 in contact with the skin 13.
The transverse frames 15, comprising a cap 12, two webs 16, 16' and two feet 20, 20', with an internal vacuum bag 49, are located over the skin 13 using a special bridge tooling (not shown) for controlling their position.
A shim layer 55 with an adhesive ply over it is laid-up over the transverse frames 15 in the overlapping regions with the longitudinal frames to cover possible gaps between them due to tolerances.
An adhesive layer 53 is laid-up on the inner face of the longitudinal beams 17, 19 in contact with the transversal frames 15 and the skin 13.
The longitudinal beams 17, 19 are located over the transverse frames 15.
A vacuum bag (not shown) is disposed over the assembly.
An autoclave curing cycle at predetermined conditions of pressure and temperature is performed. In this step the skin 13 is co-bonded with the transverse frames 15 and the longitudinal beams 17, 19. The transverse frames 15 and the longitudinal beams 17, 19 are subject to a secondary bonding.

The assembly stage may also comprise laying-up local patches of glass fiber prepreg at specific locations of the skin 13, the transverse frames 15 and the longitudinal beams 17, 19 where aluminum fittings are going to be installed.

Although the present invention has been described in connection with various embodiments, it will be appreciated from the specification that various combinations of elements, variations or improvements therein may be made, and are within the scope of the invention.

The invention claimed is:

1. A curvilinear fan cowl of an aircraft engine, made of a composite material and having a longitudinal axis parallel to a longitudinal axis of an aircraft to which is attached the fan cowl, the fan cowl comprising:
a skin, transverse frames and longitudinal beams, wherein the transverse frames and longitudinal beams are orthogonal with each other and attached to an inside surface of the skin;
the transverse frames comprise a frame cap spaced from the skin, frame webs each extending from the frame cap towards the skin, and frame feet adjacent the skin and each extending from one of the frame webs;
the longitudinal beams being formed by at least a first part in a zone crossing one of the transverse frames and at least a second part in a zone not crossing any of the transverse frames;
each first part comprising a first cap overlapping the one of the transverse frames, first webs extending from the first cap towards the skin, and first feet proximate the skin and each extending from one of the first webs, and each first part having a shape in cross section configured to seat on the one of the transverse frames,
wherein each second part of the longitudinal beams comprises a second cap spaced from the skin, a second web extending from the second cap towards the skin, and a foot adjacent the skin and extending from the second web;

wherein each of the second webs of the second parts of the longitudinal beams are arranged in a common plane;

wherein a width of the first cap on one side of the common plane is greater than a width of the first cap on the other side of the common plane, and wherein the curvilinear fan cowl is a monolithic ensemble.

2. The curvilinear fan cowl according to claim 1, wherein the second cap includes a first portion having a constant width (W3) and which extends extending equally from both sides of the common plane, and the first cap has a width larger than twice W3.

3. The curvilinear fan cowl according to claim 2, wherein:

the first cap comprise a first width (W1) extending from one side of the common plane and a second width (W2) extending from the other side of the common plane, wherein W2 is larger than W1;

the second cap has an end cap having a recess at one side of the common plane, and the second cap has a variable width on the other side of the common plane, which variable width increases from W1 to W2.

4. The curvilinear fan cowl according to claim 1, wherein the second part includes a rib transverse to the second web.

5. The curvilinear fan cowl according to claim 1, wherein at least one of the longitudinal beams comprise a second part with a central portion of a variable height.

6. The curvilinear fan cowl according to claim 1, wherein the transverse frames are omega-shaped in cross-section.

7. The curvilinear fan cowl according to claim 1, comprising at least two of the longitudinal beams which each overlaps the transverse frames.

8. The curvilinear fan cowl according to claim 7, wherein at least one of the longitudinal beams overlaps only a group of less than all of the transverse frames.

9. A method of manufacturing a curvilinear fan cowl comprising:
a) providing an uncured skin, cured transverse frames, and cured longitudinal beams, wherein the transverse frames and the longitudinal beams include respectively adhesive layers against inner faces of the transverse frames and the longitudinal beams, wherein each of the longitudinal beams includes a cap and a portion of the cap at a region of the beam overlapping one of the transverse frames in asymmetrical with respect to a plane defined by a web of the beam extending longitudinally along the beam such that a width of the cap at the region is greater on one side of the plane than a width of the cap on the other side of the plane;
b) placing the uncured skin on an autoclave tool;
c) placing said transverse frames with internal vacuum bags on the uncured skin, wherein the vacuum bags being used during an autoclave cycle;
d) placing said longitudinal beams over the transverse frames and the skin;
e) covering with another vacuum bag an assembly of the uncured skin, the transverse frames with the internal vacuum bags and the longitudinal beams; and
f) performing on the assembly the autoclave cycle under predetermined temperature and pressure conditions for co-bonding the skin, the transverse frames and the longitudinal beams and for a secondary bonding of the longitudinal beams to the transverse frames.

10. The method according to claim 9, wherein the step d) also comprises placing a shim layer over the areas of transverse frames to be crossed by the longitudinal beams.

11. The method according to claim 9, also comprising laying-up patches of a corrosion protection layer in those locations of the skin, the transverse frames and the longitudinal beams foreseen for the installation of metallic fittings.

12. The method according to claim 9, wherein in step a) the uncured skin is provided with a lightening protecting layer in its outer face.

13. A fan cowl for an aircraft engine comprising:
a composite material skin configured to extend around the aircraft engine;
composite material transverse frames attached to an inside surface of the skin and extending circumferentially with respect to an axis of the fan cowl, wherein the transverse frames are spaced apart in an axial direction with respect to the axis;
composite material beams attached to the inside surface of the skin and extending in the axial direction, wherein the beams include a first part overlapping one of the transverse frames and a second part extending between adjacent ones of the transverse frames,
the first part of each beam including a first cap, a pair of first webs extending from the first cap, and first feet extending from first webs and proximate the skin, wherein the first cap and pair of first webs are configured to overlap sides of the one of the transverse frames, and
the second part of each beam includes a second cap, a second web extending from the second cap, and a foot extending from the second web and adjacent the skin, wherein the second web defines a plane;
wherein the first cap extends a first axial distance (W1) from the plane and extends a second axial distance (W2) on an opposite side of the plane, and W1 is smaller than W2.

14. The fan cowl of claim 13 wherein the second cap gradually increases in width in a direction towards the first cap.

15. The fan cowl of claim 14 wherein the gradual increase in the width on a single side of the second cap.

16. The fan cowl of claim 13 wherein the first cap and the second cap are formed of a single piece composite material.

17. The fan cowl of claim 13 wherein an axial end of the pair of first webs ends at W1.

* * * * *